United States Patent [19]

Briggs et al.

[11] Patent Number: 5,472,805
[45] Date of Patent: Dec. 5, 1995

[54] CARBON/CARBON MATERIALS USEFUL AS NA/S BATTERY CONTAINER/CURRENT COLLECTOR

[75] Inventors: Donald C. Briggs, Mt. View; Harold L. Hillesland, Fremont; Brian D. Lewis, Sunnyvale, all of Calif.

[73] Assignee: Space Systems/Loral, Inc., Palo Alto, Calif.

[21] Appl. No.: 130,037

[22] Filed: Dec. 7, 1987

[51] Int. Cl.$^6$ .................................................. H01M 4/36
[52] U.S. Cl. ................................. 429/104; 136/236.1
[58] Field of Search ........................ 429/104; 136/236.1

[56] References Cited

U.S. PATENT DOCUMENTS

| | | | |
|---|---|---|---|
| 3,404,035 | 10/1968 | Kummer et al. | 136/6 |
| 3,404,036 | 10/1968 | Kummer et al. | 136/6 |
| 3,413,150 | 11/1968 | Kummer et al. | 136/6 |
| 3,446,677 | 5/1969 | Tennenhouse | 136/153 |
| 3,458,356 | 7/1969 | Kummer et al. | 136/83 |
| 3,468,709 | 9/1969 | Kummer | 136/6 |
| 3,468,719 | 9/1969 | Tennenhouse | 136/153 |
| 3,475,220 | 10/1969 | Knorr | 136/153 |
| 3,475,223 | 10/1969 | Kummer | 136/6 |
| 3,475,225 | 10/1969 | Tennenhouse | 136/86 |
| 3,535,163 | 10/1970 | Dzieciuch et al. | 136/6 |
| 3,719,531 | 3/1973 | Dzieciuch et al. | 136/153 |
| 3,748,178 | 7/1973 | Fally et al. | 429/104 |
| 3,959,013 | 5/1976 | Breiter | 136/6 FS |
| 4,048,390 | 9/1977 | Chatterji et al. | 429/102 |
| 4,110,516 | 8/1978 | Breiter | 429/104 |
| 4,117,209 | 9/1978 | Markin et al. | 429/104 |
| 4,131,226 | 12/1978 | Breiter et al. | 228/198 |
| 4,146,684 | 3/1979 | Fischer et al. | 429/104 |
| 4,160,069 | 7/1979 | Johnson et al. | 429/104 |
| 4,166,156 | 8/1979 | Ludwig | 429/104 |
| 4,169,120 | 9/1979 | Miller | 429/104 X |
| 4,216,275 | 8/1980 | Hartman et al. | 429/104 |
| 4,226,922 | 10/1980 | Sammells | 429/104 |
| 4,232,098 | 11/1980 | Park et al. | 429/104 |
| 4,248,943 | 2/1981 | Ludwig et al. | 429/104 |
| 4,279,974 | 7/1981 | Nishio | 429/104 |
| 4,360,575 | 11/1982 | Brennan | 429/104 |
| 4,396,669 | 8/1983 | Cariou | 428/280 |
| 4,456,631 | 6/1984 | Crosbie et al. | 429/104 |
| 4,456,664 | 6/1984 | Crosbie et al. | 429/104 |

FOREIGN PATENT DOCUMENTS 2013022  8/1979  United Kingdom.

OTHER PUBLICATIONS

Tischer, Ed. *The Sulfur Electrode* Academic Press, New York et al., 1983, pp. 260–263.

*Primary Examiner*—Peter A. Nelson
*Attorney, Agent, or Firm*—Edward J. Radlo

[57] ABSTRACT

The invention is directed to an electrically conductive current collector suitable for use in corrosive environments at high temperatures. The current collector comprises a shaped carbon/carbon material consisting of a woven arrangement of substantially continuous carbon filaments having a high tensile modulus impregnated with carbon particulate. The invention is also directed sodium/sulfur batteries employing same, generally as the current collector/container.

14 Claims, 1 Drawing Sheet

CARBON/CARBON MATERIALS USEFUL AS NA/S BATTERY CONTAINER/CURRENT COLLECTOR

TECHNICAL FIELD

This invention relates to electronically conductive, corrosion resistant cathodic current collectors suitable for use in high temperature applications in the presence of corrosive environments. More particularly, this invention relates to carbon/carbon material suitable as the current collector or current collector/container in energy conversion devices such as the sodium/sulfur battery.

BACKGROUND ART

Sodium/sulfur (Na/S) electrochemical cells or batteries are well known in the art and generally have at least one anodic reaction zone containing anodic reactant (sodium) and at least one cathodic reaction zone containing cathodic reactant (polysulfides, sulfur). The reaction zones are separated from each other by a sodium ion conducting solid electrolyte and the battery also has a current collector (i.e., electrode) in contact with the cathodic reactant. Such batteries operate at relatively high temperatures which accelerate the corrosion of battery materials which contact the sulfur and polysulfides. Thus corrosion is deleterious to the battery both from the standpoint of the resulting physical change of, e.g., the current collector (especially when it also serves as the cell container) and the reduction of the cell's capacity due to the reaction of the sulfur in the formation of corrosion products (i.e., cathodic reactant is used up). The corrosion products themselves form surface layers on the electrode that increase contact resistance to the electrode. Also, soluble corrosion products can be redeposited, clogging the electrode, obstructing transport of active materials, and causing uneven current distribution. If deposited on the electrode surface, they change its structure and wetability and therewith the kinetics of reactions occurring at this surface to the point where it may become partially or completely blocked. Corrosion products can also be deposited on the surface of the solid electrolyte partially blocking, damaging or destroying it by causing locally excessive current densities or by direct interaction or penetration.

In an attempt to overcome these corrosion problems associated with the sodium-sulfur battery, a variety of materials have been proposed for use in contact with sulfur and polysulfides in a Na/S battery. For example, in U.S. Pat. No. 3,413,150 proposes the use of aluminum with a coating of chromium or titanium or chromel (a nickel-chromium alloy) as a corrosion resistant material.

In U.S. Pat. No. 3,959,013, a proposal is made to use a corrosion resistant and electronically conducting layer of molybdenum or graphite over metal, e.g., stainless steel, to reduce the corrosion of such metals in a sodium-sulfur cell.

U.S. Pat. No. 4,048,390 suggests that a protective coating of aluminum be placed on the surface of the battery container which is to confine the polysulfide and sulfur reactants. This patent proposes the use of aluminum because it forms a continuous coating of aluminum sulfide over its exposed surface.

U.S. Pat. No. 4,110,516 suggests forming the confining container of aluminum and then placing over the aluminum either a single layer of chrome or a layer of zinc with a layer of chrome thereover, the chrome surface being the surface which contacts the corrosive reactants which are to be confined therewithin.

The following two patents attempt to overcome problems associated with the use of chromium or chromium alloys in a Na/S battery. U.S. Pat. No. 4,117,209 teaches a cathodic current collector comprising an aluminum substrate, a nickel-chromium alloy interlayer and an outer layer of an electronically conductive oxide which is intrinsically inert to the cathodic reactant, e.g., titanium oxide. British Patent No. 2,013,022 suggests a cathodic current collector for a Na/S battery comprising an aluminum substrate, a nickel-chromium alloy interlayer and an outer layer of a nickel oxide coating. In these two patents, the oxide outer layer is provided to offer protection to the interlayer against the cathodic reactant while providing electronic contact with the interlayer.

U.S. Pat. No. 4,131,226 discloses a cathodic electrode/container for a sodium sulfur battery in which a liner material of metal such as stainless steel, molybdenum or a nickel/chromium alloy is used as an anticorrosive surface for a mild steel container.

In U.S. Pat. No. 4,160,069, the current collector comprises a corrosion resistant ceramic member and an intimately attached metal cladding. The ceramics employed comprise doped rutile $TiO_2$, doped calcium titanate and lanthanum strontium chromite.

U.S. Pat. No. 4,166,156 teaches employing a current collector and/or container or liner of the cell or battery comprising a shaped graphite body bearing a coating of pyrolytic graphite on at least those surfaces thereof which are exposed to the cathodic reactant during operation of the cell. Such bodies may be made by compressing graphite into a shape and then pyrolyrically depositing graphite on or into the pores of the shaped graphite body. In contrast to the graphite/graphite electrode material of that invention, the electrode material of this invention is a carbon/carbon material woven of high tensile modulus carbon filaments in toe configuration impregnated with carbon particulate. Because the filaments of the electrode material are substantially continuous as compared to the graphite body which has pores, the carbon/carbon material has better electrical conductivity than the graphite/graphite bodies.

U.S. Pat. No. 4,216,275 attempts to overcome the corrosive nature of the polysulfide melt of a Na/S battery by providing a metal cell wall which is coated first with a prime coat of nickel and aluminum, and then applied on this prime coat is a coating of an alloy of chromium and at least one metal of the group of iron, cobalt and nickel.

U.S. Pat. No. 4,226,922 suggests that longevity of the cathodic current collector can be obtained if the metallic current collector has a boronized surface and an additional boron source in physical proximity to the boronized current collector surface.

Still another approach to forming a non-corrosive, electrically conductive component for a sodium sulfur cell is taught in U.S. Pat. No. 4,232,098. The component comprises a fiber-carbon substrate and a non-porous chromium-iron-carbon duplex alloy surface layer chemically diffusion bonded to the substrate. However, the component would be expected to have significant (series) resistance and degrade with high temperature operation.

In U.S. Pat. No. 4,248,943 a coating of chromium/chromium oxide is placed on the surfaces of the electrically conducting components of a Na/S battery to combat corrosion by molten sodium polysulfide and sulfur reactant.

In U.S. Pat. No. 4,279,943, stainless steel, fibrous or felt form, are proposed for use as a corrosion titanium nitride, graphite or carbon, especially in resistant cathodic electrode material in a Na/S battery.

Doped chromium oxide is taught in U.S. Pat. Nos. 4,456,631 and 4,456,664 to be useful as a coatings on metal or metal alloy so as to form corrosion resistant current collectors suitable for use in Na/S batteries. The patents teach lithia doped and magnesia doped chromium oxides, respectively.

DISCLOSURE OF THE INVENTION

The invention of this application comprises an electrically conductive current collector having a region suitable for use in contact with a corrosive environment. The current collector comprises a shaped carbon/carbon material woven of substantially continuous carbon filaments in toe configuration impregnated with carbon particulate. The filaments have a tensile modulus greater than about 70 million lbs/in$^2$ (psi), preferably between about 75 psi and about 140 million psi. The toe configuration comprises up to about 5000 carbon filaments, preferably between about 1000 and about 2000 carbon filaments.

This invention is also directed to an electrochemical cell or battery employing the current collector described above wherein further the current collector may also serve as the container. If the current collector is also the container, a metal (e.g., stainless steel or steel) may be provided intimately attached to the outside of the carbon/carbon material, to provide axial conductivity and, optionally, structural support to the carbon/carbon container.

Advantageously, we have found that the current collector of this invention is electronically conductive, is noncorrosive and impermeable to corrosive substances such as polysulfide and mechanically stable when subject to thermal cycling, making it ideally suitable as a current collector and, more particularly, as the current collector/container in a Na/S battery. With respect to the present invention, hereinafter it is to be understood that use of the terms "current collector" or "current collector/container" is meant to include reference to the other, i.e., a current collector may also be a current collector/container.

More particularly, the current collector of this invention has shown no signs of corrosive attack when exposed to sulfur or polysulfide melt at 350° C. for extended periods of time. During this time they were polarized anodically, cathodically, and/or cycled at current densities sufficient to expose the carbon/carbon material to the entire span of melt compositions between sulfur and Na$_2$S$_3$, to which parts of the container (current collector) can be exposed locally during operation of a Na/S call. Additionally, the carbon/carbon material was thermally stable during such cycling. Still further, the carbon/carbon material of the current collector of this invention is an excellent conductor having a conductivity approaching metals like aluminum.

DETAILED DESCRIPTION OF THE INVENTION

Figure 1:
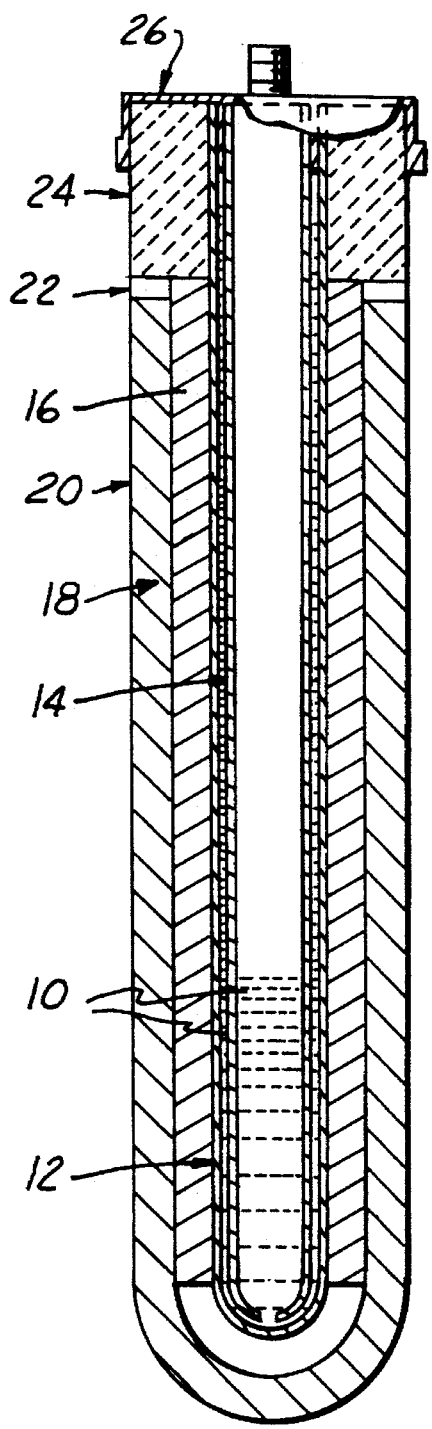
FIG. 1 shows a vertical sectional view of one embodiment of a Na/S cell including the carbon/carbon current collector of this invention.

As discussed briefly above, the current collector of this invention comprises a shaped carbon/carbon material woven of substantially continuous carbon filaments in toe configuration, impregnated with carbon particulate, which carbon filaments have a tensile modulus greater than about 70 million psi. Preferably the tensile modulus of the carbon filaments is between about 75 psi and about 140 million psi. In this invention, the tensile modulus is that of the woven carbon filaments before impregnation with the carbon particulate. Since the tensile modulus of the carbon filaments is directly proportional to the electrical conductivity of the filaments, selection of the filaments (having a proper tensile modulus) would be dependent on the desired electrical conductivity of the current collector of this invention. Selection of the carbon filaments having optimal tensile modulus for use in a particular current collector will be apparent to those skilled in the art in view of the present disclosure. Each toe (i.e., end) configuration of carbon filaments comprises up to about 5000 carbon filaments, preferably between about 1000 and about 2000 filaments. Selection of the optimal number of filaments per toe configuration is dependent, e.g., upon the geometry requirements. Thicker current collector elements generally require a larger number of carbon filament ends. For very thin elements, even 500 filaments might be considered. Selection of the optimal number of filaments per toe configuration will be apparent to those skilled in the art in view of the present disclosure. Such carbon filaments in toe configuration are commercially available, for example, as the Pitch (trademark) series available from Amoco Performance Products, Inc., Parma, Ohio, such as Pitch-100 (P-100) and Pitch-75 (P-75) and the Thornel (trademark) series. Still other carbon filaments useful in this invention are available from BASE (England), including GY-70 (trademark).

The carbon/carbon material may be made by techniques known to those skilled in the art. Exemplary of one method for making this material and a current collector according to this invention comprises first weaving the high modulus fibers into two dimentional sections, e.g., P-100 fibers of 2000 filaments per toe configuration woven into a fabric containing 20 toes per inch in both the warp and fill directions. The two dimentional woven sections of carbon fabric are subsequently impregnated with phenolic resin containing 30 weight percent of thermal carbon black Thornel-991 (trademark, Amoco Performance Products, Inc.). This resin impregnated fabric is then shaped into the desired configuration. This can be done by layering the sections over a support (i.e., a die) of desired configuration to form a shaped laminated current collector. This current collector may be, e.g., tubular like that of the carbon/carbon current collector/container (18) shown in FIG. 1. As will be apparent to one skilled in the art in view of the present disclosure, the direction of the filaments in each successive layer may be the same or be varied to obtain optimal directional electrical conductivity. Orientating the filaments of each layer in the same direction provides a laminate with anisotropic properties. Alternately, the fibers can be woven using three-dimentional weaving techniques to accomplish fiber placement in the X, Y, and Z direction. This carbon-phenolic configuration is then vacuum bagged and cured in an autoclave at 85 psi and at a temperatures stepped up to 310° F. and held for 3 hours. The carbon-phenolic preform is post-cured under 85 psi at 350° F. for 4 hours and 370° F. for 9 hours. Processing to carbon/carbon is initiated by a carbonization step wherein the preform was packed in a graphite retort, heated to 1000° F. in an oxygen purged oven, and after a 12 day period slowly cooled to room temperature. The preform is then repacked in carbon black in a graphite retort and exposed to a pyrolization step in an inert atmosphere induction heated furnace at approximately 4000° F. This pyrolization is accomplished in about another 12 day period. After the pyrolization step, the preform has a sponge-like consistency and is quite fragile. The final step in making the carbon/carbon electrode is densification and rigidization by chemical vapor deposition of carbon over a typical 125 hour cycle at about 1800° F. The density or permeability of the carbon/carbon material can be varied by the amount of carbon infused into the material by, e.g., chemical vapor deposition. While one method for forming the carbon/carbon electrode of this invention has been described above, this invention is not limited to this method. Other suitable methods will be apparent to those skilled in the art in view of the present disclosure.

The current collector is of a shape so as to conform with the design considerations of the cell in which it is used. Generally, in the Na/S battery, the cathodic current collector is also the container for the battery and most generally is a tube closed at one end. The current collector of this invention is, however, not limited to any particular shape and need not also be the battery container.

Although tubular carbon/carbon bodies prepared in accordance with the invention exhibit excellent radial conductivity, the axial conductivity of such bodies may be considered less than desirable. Therefore, it may be desirable in many applications to provide such a current collector or current collector/container with a metal surface such as by plating chromium, nickel or other metals by known means on the surface thereof opposite to the side exposed to the cathodic reactant. A plate of several mils or more in thickness is sufficient to provide the required axial conductivity. If the current collector/container consists essentially of the carbon/carbon material by itself or with only a thin metal coating as described above, the thickness of the carbon/carbon container would need to be thick enough to be structurally stable at the operating temperatures of the cell. Alternately, however, the carbon/carbon material could be used as a container liner, i.e., provided with a structurally stronger outer housing of, e.g., stainless steel or steel. This outer housing next to the carbon/carbon liner (i.e., on the side opposite the one that contacts the cathodic reactant) would then not only give structural support to the carbon/carbon material, thus allowing it to be made thinner, but also provide the desired axial conductivity to the carbon/carbon electrode. The carbon/carbon liner and the outer housing need to be intimately attached to one another in order to provide good electrical contact. Cladding or metal plating could be employed to provide good contact and adhere the carbon/carbon liner to the outer housing material. Alternately, the outer housing material may be made of non-conducting materials such as glass or ceramic. In this instance, a thin metal coating such as aluminum would also be preferably employed between the carbon/carbon material and the non-conducting outer housing.

Current collectors of the invention as described above would be useful as current collectors or as current collector/containers in a variety of applications wherein a corrosion resistant, electronically conducting member operative at high temperatures is desirable, such as in electrochemical cells or batteries, e.g., molten carbonate fuel cells or Na/S batteries. An Na/S battery comprises (1) an anodic reaction zone containing a molten alkali metal reactant-anode in electrical contact with an external circuit; (2) a cathodic reaction zone containing a cathodic reactant comprising a molten liquid electrolyte which is electrochemically reactive with the anodic reactant and a current collector at least one region of which is exposed to the cathodic reactant; and (3) a cation-permeable barrier to mass liquid transfer interposed between and in contact with the anodic and cathodic reaction zones, the current collector being in electrical contact with both the cation-permeable barrier and said external circuit. The current collector may also serve as a container for the cathodic reactant. In a Na/S battery, the anodic reactant is sodium and the cathodic reactant comprises molten polysulfide salts or a mixture of sulfur and sulfur saturated molten polysulfide salts. Such sodium/sulfur batteries are well known to those skilled in the art and are disclosed in the following U.S. Pat. Nos.: 3,404,035; 3,404,036; 3,413,150; 3,446,677; 3,458,356; 3,468,709; 3,468,719; 3,475,220; 3,475,223; 3,475,225; 3,535,163; and 3,719,531. Generally, and preferably, a porous electrode disposed within the cathodic reaction zone is employed such that it makes an excellent electrical contact. Generally, and preferably, a porous graphite mat electrode is placed within the cathodic reaction zone such that it makes good electrical contact with the container.

FIG. 1 shows one embodiment of a sodium/sulfur battery having the improvement of the invention. In this figure, the sodium (10) is contained in the center of the beta-alumina electrolyte tube (12). The sodium cartridge (14) provides, in a limited way, a secondary structural enclosure tube for the sodium. The beta-alumina electrolyte tube is surrounded with a sulfur precast (16) of sulfur cast in graphite and the entire assembly is enclosed by a carbon/carbon container (18). The carbon/carbon container has a metal cladding (20). Alternately, a carbon coating could be provided by chemical vapor deposition. A metal to alpha-alumina bond (22) is provided at between the alpha-alumina header section (24) and the metal cladding. Following bonding of the alpha-alumina header section to the electrolyte assembly, the cell is ready to have a stainless steel end cap (26) with a memory ring seal installed. After filling with sodium, the cell is welded closed and the assembled cell is ready for initial heat up and testing.

Figure 2:
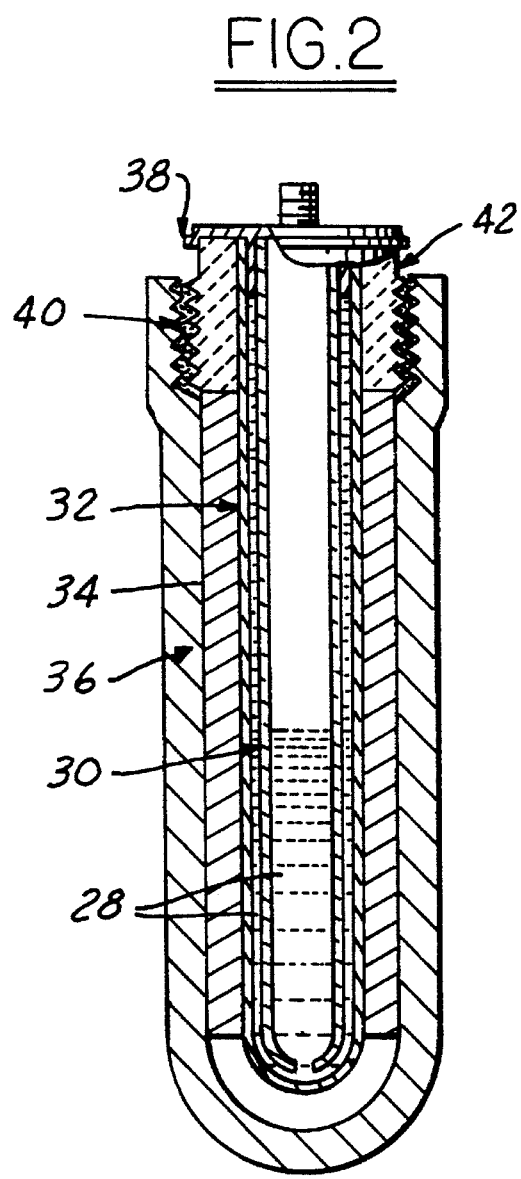
FIG. 2 shows a vertical sectional view of another embodiment of a Na/S cell including the carbon/carbon current collector of this invention.

FIG. 2 shows another embodiment of a sodium/sulfur battery similar to that of FIG. 1 which comprises sodium (28), a sodium cartridge (30), a beta-alumina electrolye (32), sulfur cast in graphite (34), a carbon/carbon container (36), and a metal ring seal (38). However, the container is shaped differently at the top so as to allow alternate methods of attaching the alpha-alumina electrolyte header section to the container. An epoxy-polyimide filled threaded joint (40) is used to bond the alpha-alumina section (42) to the carbon-carbon container. The fact that the carbon/carbon container can be readily shaped at the top allows for various methods of attachment to the alpha-alumina header, i.e., threading, bonding, compression rings, swedging, etc. Still further, as can be seen from FIG. 2, a tubular container made of carbon/carbon according to this invention can be configured so as to be a continuous (i.e., a one piece) closed end tube. Thus formation of a carbon/carbon container according to this invention eliminates complex fabrication steps required to make conventional tubular containers, i.e., a disc bottom is attached to a cylindrical tube.

In view of this disclosure, many modifications of this invention will be apparent to those skilled in the art. It is intended that all such modifications

We claim:

1. An electrically conductive current collector having a region suitable for use in contact with a corrosive environment, characterized in that substantially the entire said region of said current collector comprises a shaped, substantially impermeable carbon/carbon material woven of substantially continuous carbon filaments in toe configuration, impregnated with carbon particulate, which carbon filaments have a tensile modulus greater than about 70 million lbs/in$^2$ and wherein said toe configuration comprises up to about 5000 carbon filaments.

2. The current collector according to claim 1, wherein said carbon filaments have a tensile modulus between about 75 lbs/in$^2$ and about 140 million lbs/in$^2$.

3. The current collector according to claim 1, wherein said toe configuration comprises between about 1000 and about 2000 carbon filaments.

4. The current collector according to claim 1, wherein said material is woven in a two-dimentional arrangement.

5. The current collector according to claim 1, wherein said material is woven in a three-dimentional arrangement.

6. The current collector according to claim 1, wherein said current collector is shaped in a tubular configuration having one closed end.

7. An electrochemical battery comprising:

(1) an anodic reaction zone containing a molten alkali metal reactant anode in electrical contact with an external circuit; (2) a cathodic reaction zone containing a cathodic reactant comprising a molten liquid electrolyte which is electrochemically reactive with said anodic reactant and a current collector having at least a region exposed to said cathodic reactant; and (3) a cation-permeable barrier to mass liquid transfer interposed between and in contact with said anodic and cathodic reaction zones, said current collector being in electrical contact with both said cation-permeable barrier and said external circuit, wherein the improvement comprises:

employing as said current collector in said device a current collector having a region suitable for use in contact with a corrosive environment, characterized in that substantially the entire said region of said current collector comprises a shaped, substantially impermeable carbon/carbon material woven of substantially continuous carbon filaments in toe configuration, impregnated with carbon particulate, which carbon filaments have a tensile modulus greater than about 70 million lbs/in and wherein said toe configuration comprises up to about 5000 carbon filaments.

8. The electrochemical battery according to claim 7, wherein said carbon filaments have a tensile modulus between about 75 lbs/in$^2$ and about 140 million lbs/in$^2$.

9. The electrochemical battery according to claim 7, wherein said toe configuration comprises between about 1000 and about 2000 carbon filaments.

10. The electrochemical battery according to claim 7, wherein said material is woven in a two-dimentional arrangement.

11. The electrochemical battery according to claim 7, wherein said material is woven in a three-dimentional arrangement.

12. The electrochemical battery according with claim 7, wherein said current collector also serves as a container for said cathodic reactant.

13. The electrochemical battery according to claim 12, wherein said current collector is shaped in a tubular configuration having one closed end.

14. The electrochemical battery according to claim 7, wherein said anodic reactant is sodium and said cathodic reactant comprises molten polysulfide salts or a mixture of sulfur and sulfur saturated molten polysulfide salts.

* * * * *